United States Patent
Fujii (10) Patent No.: US 7,369,172 B2
(45) Date of Patent: May 6, 2008

(54) VEHICULAR CAMERA

(75) Inventor: Yoshiyuki Fujii, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 778 days.

(21) Appl. No.: 10/840,623

(22) Filed: May 7, 2004

(65) Prior Publication Data

US 2005/0099527 A1    May 12, 2005

(30) Foreign Application Priority Data

Nov. 12, 2003    (JP) ............................ P2003-382666

(51) Int. Cl.
*H04N 5/225* (2006.01)
*H04N 7/00* (2006.01)
*H04N 7/18* (2006.01)
*H04N 9/47* (2006.01)

(52) U.S. Cl. ...................................... 348/342; 348/118

(58) Field of Classification Search ................ 348/342, 348/118, 135; 359/885, 890; 382/104
See application file for complete search history.

(56) References Cited

U.S. PATENT DOCUMENTS

| 6,281,805 | B1 * | 8/2001 | Lee ............................ 340/901 |
| 6,774,988 | B2 * | 8/2004 | Stam et al. ................. 356/218 |
| 2005/0129279 | A1 * | 6/2005 | Unwin ....................... 382/104 |

FOREIGN PATENT DOCUMENTS

JP        09-083879 A       3/1997

* cited by examiner

*Primary Examiner*—Ngoc-Yen Vu
*Assistant Examiner*—James A Meyers
(74) *Attorney, Agent, or Firm*—Sughrue Mion, PLLC

(57) ABSTRACT

A vehicular camera for detecting desired imaging objects by shooting the surroundings of a vehicle includes a lens for forming an image of light on an image pickup device, an optical filter capable of selectively transmitting a component of light in a particular wavelength range, the image pickup device for performing photoelectric conversion on the image formed thereon, and an image processing unit for producing a prescribed video signal by processing a signal produced by the image pickup device.

14 Claims, 5 Drawing Sheets

VEHICULAR CAMERA

BACKGROUND OF THE INVENTION

1. Field of the Invention

The present invention relates to a vehicular camera that is mounted on a vehicle, shoots the surroundings, and, in particular, is used for detecting a desired object from a resulting video signal with such a means as image processing.

2. Description of the Related Art

In recent years, vehicular cameras that are mounted on an automobile (a CCD camera (i.e., a camera using a solid-state image pickup device) is mounted on the automobile) and that recognize white lines on the road on which the automobile is running, detect an obstacle, and perform like operations have been developed as apparatus for securing safety driving of automobiles.

For example, a camera disclosed in JP-A-9-83879 (hereinafter referred to as patent document 1) is known as a conventional vehicular camera, in particular, a camera that is premised on image processing and exhibits a pronounced effect when using an optical filter.

The camera of patent document 1 is such that a polarizing filter and an infrared filter are integrated with each other and incorporated in a camera, whereby inclusion of undesired light coming from the windshield can be prevented and reflection light from a road surface can be eliminated without causing deterioration of the polarizing filter by direct sunlight or occurrence of a ghost image. As a result, white lines on the road on which the automobile is running, nearby vehicles, etc. can be shot clearly.

For example, when a scene in front of the automobile is shot with a video camera, there may occur a case that lane boundary lines and vehicles ahead are buried in reflection light from the road surface that is caused by shooting against the sun or the road surface being wet, to disable recognition by image processing.

The vehicular camera of patent document 1 eliminates only a horizontally polarized reflection light component, and hence can shoot white lines and vehicles ahead clearly even under bad conditions as described above and facilitates later image processing as post-processing.

Incidentally, in cameras such as the above-described vehicular cameras that are premised on image processing, it is very important to obtain camera performance that conforms to the object or algorithm of the image processing. For example, in image processing for recognizing traffic lane boundary lines, it is a general procedure to perform the image processing paying attention to the fact that the luminance of the lane boundary lines are higher than that of the road surface. Cameras are required to reproduce the luminance relationship between the road surface and white lines faithfully at proper contrast.

Roads in which white lines are formed on an asphalt road are free of problems because the luminance of the white lines are sufficiently higher than that of the road surface. However, problems may occur in roads in which yellow lines are formed on an asphalt road or white lines are formed on a concrete road, because the difference in luminance between the road surface and the lane boundary lines is small and the contrast of a video signal is low. This adversely affects the cognitive performance of the image recognition such as the recognition rate, the reliability of recognition, and the stability.

Where yellow lines are formed on a concrete road, the luminance of the yellow lines is lower that that of the road surface. This results in a problem that the lane boundary lines cannot be recognized if the relative luminance relationship between the road surface and the lane boundary lines is reproduced faithfully.

Polarizing filters that are used in conventional vehicular cameras as exemplified by the one disclosed in patent document 1 cannot solve the above problems because they do not change the relative luminance relationship except for a case of handling polarized light.

SUMMARY OF THE INVENTION

The present invention has been made to solve the above problems in the art, and an object of the invention is therefore to provide a vehicular camera capable of facilitating image processing and producing a clear image even in a bad environment in terms of image processing by using an optical filter that produces a difference in luminance (i.e., light quantity) between an object of imaging and a background.

Another object of the invention is to provide a vehicular camera capable of preventing a ghost image due to inner surface reflection by using a single-plate optical filter formed by integrating two kinds of filters (an optical filter and an infrared cutting filter) having different spectral transmittance characteristics.

One aspect of the invention provides a vehicular camera for detecting desired imaging objects by shooting surroundings of a vehicle, comprising a lens for forming an image of light coming from the outside on an image pickup device; the image pickup device for performing photoelectric conversion on the image formed thereon; an image processing unit for producing a video signal by processing a signal produced by the image pickup device; and an optical filter for causing a difference between luminance of each of n kinds of objects to be detected and luminance of a background, the optical filter having a spectral transmittance characteristic $F(\lambda)$ that satisfies $$\int F_1(\lambda)F(\lambda)d\lambda > \int F_m(\lambda)F(\lambda)d\lambda$$

$$\int F_2(\lambda)F(\lambda)d\lambda > \int F_m(\lambda)F(\lambda)d\lambda$$

$$\int F_n(\lambda)F(\lambda)d\lambda > \int F_m(\lambda)F(\lambda)d\lambda$$

where $\lambda$ is wavelength of light, $F_1(\lambda), F_2(\lambda), \ldots, F_n(\lambda)$ are spectral characteristics of the n kinds of objects to be detected, respectively, and $F_m(\lambda)$ is a spectral characteristic of a background.

Another aspect of the invention provides a vehicular camera comprising an optical filter that transmits a component whose wavelength $\lambda$ satisfies $$470 \text{ nm} \leq \lambda \leq 740 \text{ nm},$$

wherein desired objects to be detected include white and yellow lane boundary lines on a road and a background is an asphalt or concrete road surface.

The vehicular camera may further comprise an infrared cutting filter that is used in combination with the above optical filter.

The optical filter and the infrared cutting filter may be integrated with each other to form a single-plate filter.

DESCRIPTION OF THE PREFERRED EMBODIMENTS

Embodiment 1

Figure 1:
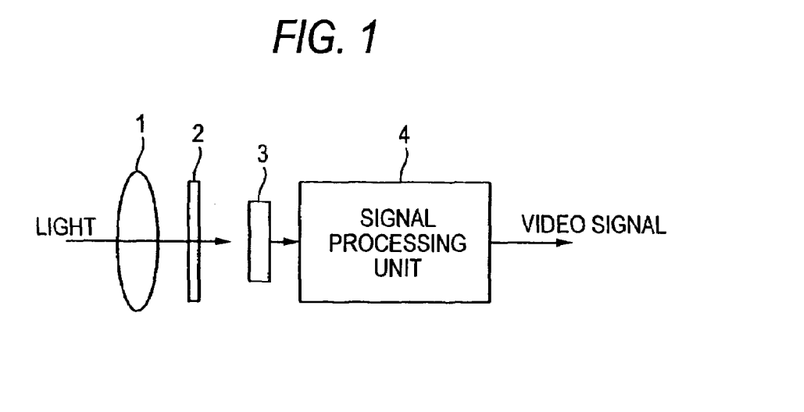
FIG. 1 schematically shows the configuration of a vehicular camera according to a first embodiment of the present invention.

FIG. 1 schematically shows the configuration of an important part of a vehicular camera according to a first embodiment of the present invention. In FIG. 1, reference numeral 1 denotes a lens for forming an image of light on an image pickup device 3 (described later) and numeral 2 denotes an optical filter capable of wavelength selection of light passing through it.

Figure 2:
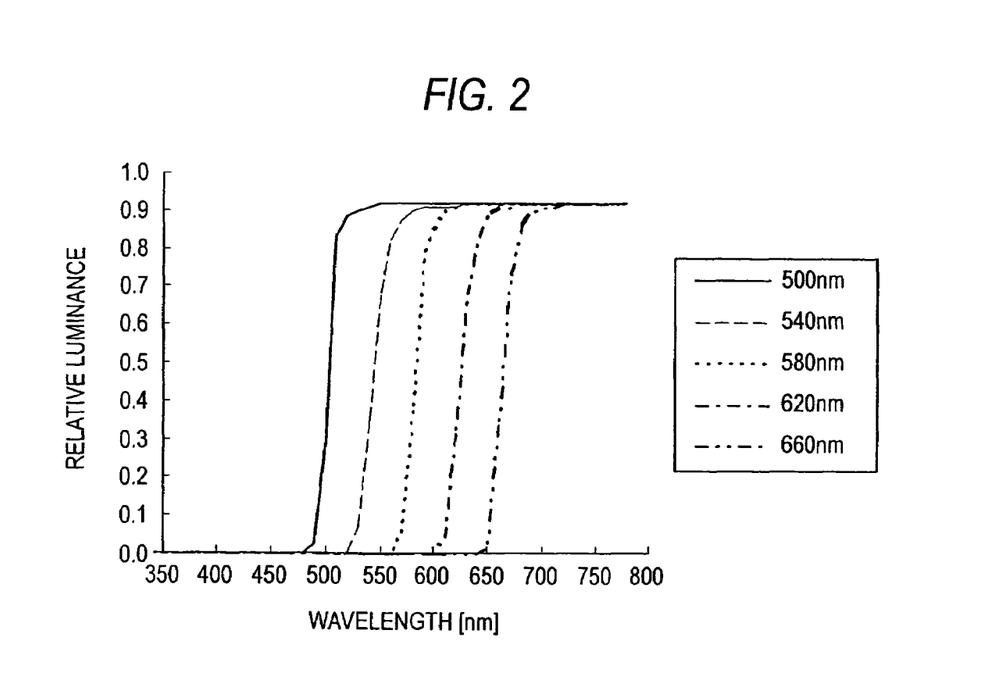
FIG. 2 is a graph showing spectral transmittance characteristics of various optical filters.

For example, the optical filter 2 is a filter that is generally called a color filter or a colored glass filter and utilizes coloration of glass by colored ions or colloid. Various filters such as filters that transmit light in long wavelength ranges and filters that well transmit light in relatively short wavelength ranges can be used as the optical filter 2. FIG. 2 shows spectral transmittance characteristics of various optical filters.

Reference numeral 3 denotes an image pickup device for performing photoelectric conversion and is, for example, a solid-state image pickup device such as a CCD image pickup device. Reference numeral 4 denotes a signal processing unit for producing a video signal by performing signal processing on a signal that is produced by the image pickup device 3 through photoelectric conversion.

Naturally, the optical filter 2 need not always be disposed between the lens 1 and the image pickup device 3 and may be disposed before the lens 1. Alternatively, a cover glass of the image pickup device 3 may have the function of the optical filter 2.

A description will be made of a case that the above-configured vehicular camera is used for the purpose of recognizing lane boundary lines on a road surface.

In recognizing lane boundary lines on a road surface, image processing is performed by paying attention to the fact that the lane boundary lines, that is, white lines or yellow lines, are usually brighter than the road surface. No problems arise in the case where white lines are formed on an asphalt road, because the white lines are brighter than the road surface. However, recognition is impossible in the case where yellow lines are formed on a concrete road, because the yellow lines are darker than the road surface.

Figure 3:
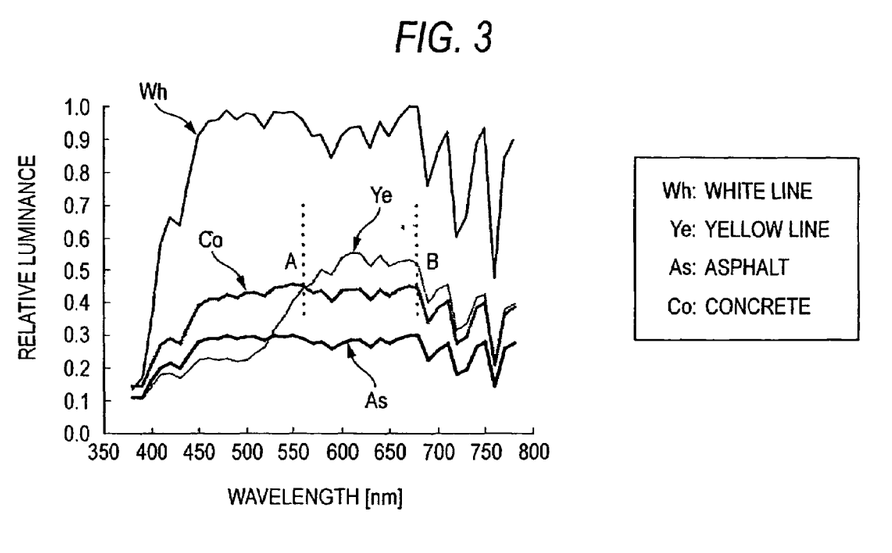
FIG. 3 is a graph showing spectral characteristics of road surfaces and lane boundary lines.

FIG. 3 shows four spectral characteristics of a white line Wh, a yellow line Ye, an asphalt road As, and a concrete road Co. The quantity of light reaching the image pickup device 3 is an integral value of each of the above spectral characteristics. Therefore, the quantities of light incident on the image pickup device 3 are given by $\int Wh(\lambda)d\lambda$, $\int Ye(\lambda)d\lambda$, $\int As(\lambda)d\lambda$, and $\int Co(\lambda)d\lambda$ where $Wh(\lambda)$, $Ye(\lambda)$, $As(\lambda)$, and $Co(\lambda)$ are the spectral characteristics of the white line, yellow line, asphalt road, and concrete road, respectively.

As seen from FIG. 3, the following relationships hold:

$$\int Wh(\lambda)d\lambda > \int As(\lambda)d\lambda, \text{ and}$$

$$\int Wh(\lambda)d\lambda > \int Co(\lambda)d\lambda.$$

That is, the light quantity of the white line Wh is greater than the light quantities of the road surfaces As and Co.

In contrast, for the yellow line Ye, the following relationships hold:

$$\int Ye(\lambda)d\lambda > \int As(\lambda)d\lambda, \text{ and}$$

$$\int Ye(\lambda)d\lambda < \int Co(\lambda)d\lambda.$$

That is, whereas no problems arise with the asphalt road As, the light quantity of the yellow line Ye is smaller than that of the concrete road Co.

Now, attention is paid to only the spectral characteristics. Whereas the spectral characteristics of the white line Wh, asphalt road As, and concrete road Co are generally flat because they have achromatic colors, the spectral characteristics of the yellow line Ye has a peak that ranges approximately from 600 nm to 650 nm and the luminance of the yellow line Ye is higher than that of the concrete road Co in the peak range and its vicinities. Therefore, the light quantity of the yellow line Ye can be made greater than that of the concrete road Co by selecting the optical filter 2 properly so as to make good use of the peak in the spectral characteristic of the yellow line Ye. That is, significant luminance differences can be detected and the above problem can be solved by setting the spectral transmittance characteristic $F(\lambda)$ of the optical filter 2 so that $F(\lambda)$ satisfies the following relationships:

$$\int Wh(\lambda)F(\lambda)d\lambda > \int As(\lambda)F(\lambda)d\lambda,$$

$$\int Wh(\lambda)F(\lambda)d\lambda > \int Co(\lambda)F(\lambda)d\lambda,$$

$$\int Ye(\lambda)F(\lambda)d\lambda > \int As(\lambda)F(\lambda)d\lambda, \text{ and}$$

$$\int Ye(\lambda)F(\lambda)d\lambda > \int Co(\lambda)F(\lambda)d\lambda. \tag{1}$$

Figure 4:
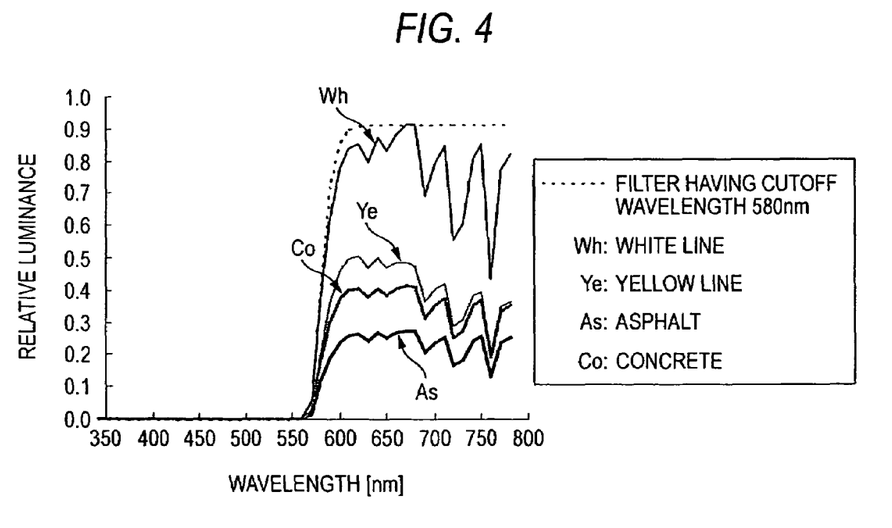
FIG. 4 is a graph showing spectral characteristics of road surfaces and lane boundary lines in the case where an optical filter that transmits a component whose wavelength is longer than or equal to 580 nm is used according to the first embodiment of the invention.

FIG. 4 shows spectral characteristics of the white line Wh, yellow line Ye, asphalt road As, and concrete road Co in the case where $F(\lambda)$ of the optical filter 2 is set so as to have a cutoff wavelength 580 nm (i.e., a component whose wavelength is longer than or equal to 580 nm is transmitted). It is seen from FIG. 4 that components in the wavelength range where the light quantity of the yellow line Ye is smaller than that of the concrete road Co are cut and components in the wavelength range where the light quantity of the yellow line Ye is larger than that of the concrete road Co are input to the image pickup device 3. Therefore, the light quantities of the white line Wh, yellow line Ye, concrete road Co, and asphalt road As decrease in this order and Inequalities (1) are satisfied.

The ratios of the light quantity of the white line Wh to the light quantities of the asphalt road As and the concrete road Co (see FIG. 3) and the same kind of ratios that are obtained with the optical filter 2 whose spectral transmittance characteristic $F(\lambda)$ has the cutoff wavelength 580 nm and that transmits a component whose wavelength is longer than or equal to 580 nm (see FIG. 4) have the following relationships:

$$\int Wh(\lambda)d\lambda / \int As(\lambda)d\lambda < \int Wh(\lambda)F(\lambda)d\lambda / \int As(\lambda)F(\lambda)d\lambda,$$
and
$$\int Wh(\lambda)d\lambda / \int Co(\lambda)d\lambda < \int Wh(\lambda)F(\lambda)d\lambda / \int Co(\lambda)F(\lambda)d\lambda.$$

It is understood that the light quantity ratios are enhanced, that is, the contrast is increased.

As described above, the use of the optical filter 2 having a proper spectral transmittance characteristic makes it possible to produce a desired light quantity difference between an object to be detected and a background and hence greatly facilitates image processing on a resulting video signal. And the reliability and the stability of the image processing can be increased to a large extent.

Embodiment 2

Although the first embodiment relates to yellow lines, significant light quantity difference can also be obtained for blue lines according to the same concept.

It is difficult to detect blue lines because their luminance value is smaller than the luminance value of a concrete road. In contrast to the case of yellow lines, blue lines have a peak ranging from 450 nm to 600 nm. Therefore, as in the case of yellow lines, a significant luminance difference can be obtained between blue lines and a concrete road by determining the cutoff wavelength of the optical filter 2 so as to make good use of the peak range.

Figure 5:
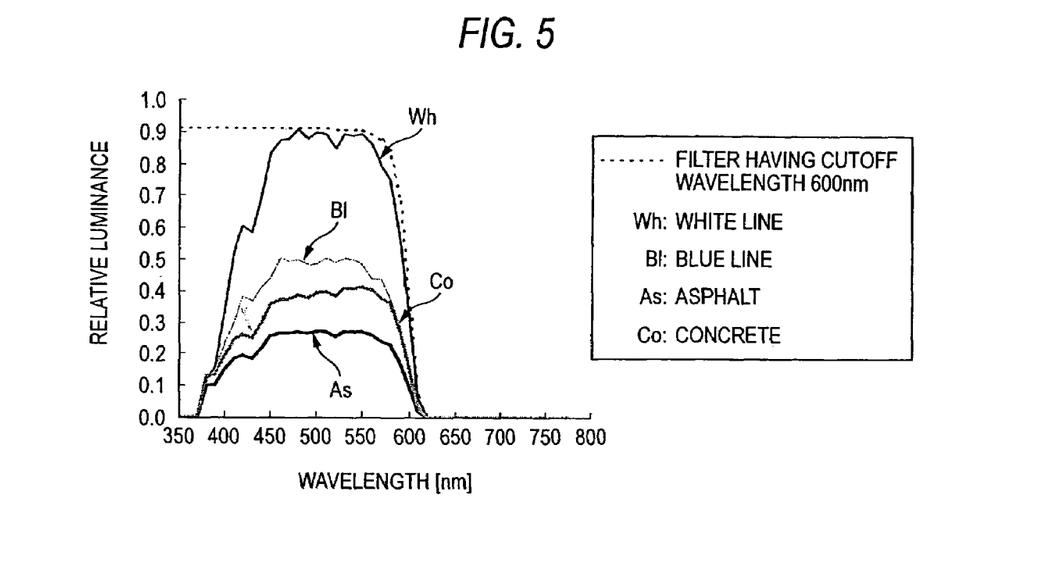
FIG. 5 is a graph showing spectral characteristics of road surfaces and lane boundary lines in the case where an optical filter that transmits a component whose wavelength is shorter than or equal to 600 nm is used according to a second embodiment of the invention.

FIG. 5 shows spectral characteristics of a white line Wh, a blue line Bl, an asphalt road As, and a concrete road Co in the case where the optical filter 2 that transmits a component whose wavelength shorter than or equal to 600 nm is used. As seen from FIG. 5, components in the wavelength range where the light quantity of the blue line Bl is smaller than that of the concrete road Co are cut and components in the wavelength range where the light quantity of the blue line Bl is larger than that of the concrete road Co are input to the image pickup device 3. Therefore, the light quantities of the white line Wh, blue line Bl, concrete road Co, and asphalt road As decrease in this order, and hence the desired object, that is, the blue line Bl, can be detected in the same manner as in the case of the first embodiment.

Embodiment 3

Although in the first and second embodiments the objects are lane boundary lines on a road surface, the imaging objects of the invention are not limited to objects on a road surface and may be any objects as long as their spectral characteristics have some features.

For example, consider a case of detecting the tail lamps of a vehicle by paying attention to the fact that they are red. A luminance difference can be produced between the tail lamps and a background that includes almost no red component by using the optical filter 2 that transmits a red component of the tail lamps.

In detecting a luminance difference between tail lamps and a background at night, light from the headlamps of an oncoming car is a background disturbance which should be addressed. However, this is not a serious problem because the spectral characteristic of the headlamps is relatively broad while that of the tail lamps has a peak that bridges red and near infrared ranges. Selecting the optical filter 2 paying attention to this feature, that is, using the optical filter 2 that transmits only red light, makes it possible to isolate the tail lamps from the background including the disturbance only on the basis of luminance information without the need for performing any particular color processing. The objects can be detected easily by later image processing with no annoyance of the background disturbance.

For example, the third embodiment of the invention is also applicable to a blinker, road surface indications (a generic term meaning marks and indications that are painted on road surfaces such as speed indications, a U-turn prohibition mark, and a crosswalk), and other traffic signs.

In the first and second embodiments, the optical filter 2 transmits a component whose wavelength is longer or shorter than the cutoff wavelength. In contrast, in this embodiment, the filtering characteristic of the optical filter 2 is not limited to those characteristics; a satisfactory result can be obtained as long as the optical filter 2 has such a spectral transmittance characteristic as to produce an effective luminance difference between an object and a background.

Where the object to be detected is a blinker, a traffic sign, or a road indication, the object can be detected by using, as the optical filter 2, an optical band-pass filter that transmits only an effective wavelength component paying attention to a specific color, that is, a spectral characteristic, of the object.

Conversely, where a blinker or the like acts as a disturbance against another object to be detected, the desired object can be detected by image processing or the like without being influenced by the disturbance by using an optical band-elimination filter that interrupts only a component in a wavelength range of the blinker or the like.

Embodiment 4

In the first embodiment, the filter that transmits a component whose wavelength is longer than or equal to 580 nm is used as the optical filter 2. However, optical filters in a certain range can satisfy Inequalities (1).

It is apparent that Inequalities (1) are satisfied in the wavelength range of a wavelength close to point A to a wavelength close to point B in FIG. 3. The cutoff wavelength of $F(\lambda)$ that satisfies $$\int Ye(\lambda)F(\lambda)d\lambda = \int Co(\lambda)F(\lambda)d\lambda \qquad (2)$$

is a lower limit wavelength that allows satisfaction of Inequalities (1). This lower limit cutoff wavelength $\Lambda b$ is obtained by integrating $Ye(\lambda)F(\lambda)$ and $Co(\lambda)F(\lambda)$ in Equation (2) from $\lambda=\Lambda b$ to $\Lambda=\Lambda r$ that is an infrared-side sensitivity limit wavelength of the image pickup device 3:

$$\int_{\lambda=\Lambda b}^{\lambda=\Lambda r} Ye(\lambda)F(\lambda)d\lambda = \int_{\lambda=\Lambda b}^{\lambda=\Lambda r} Co(\lambda)F(\lambda)d\lambda \qquad (3)$$

As a result, Λb=470 nm is obtained.

Figure 6:
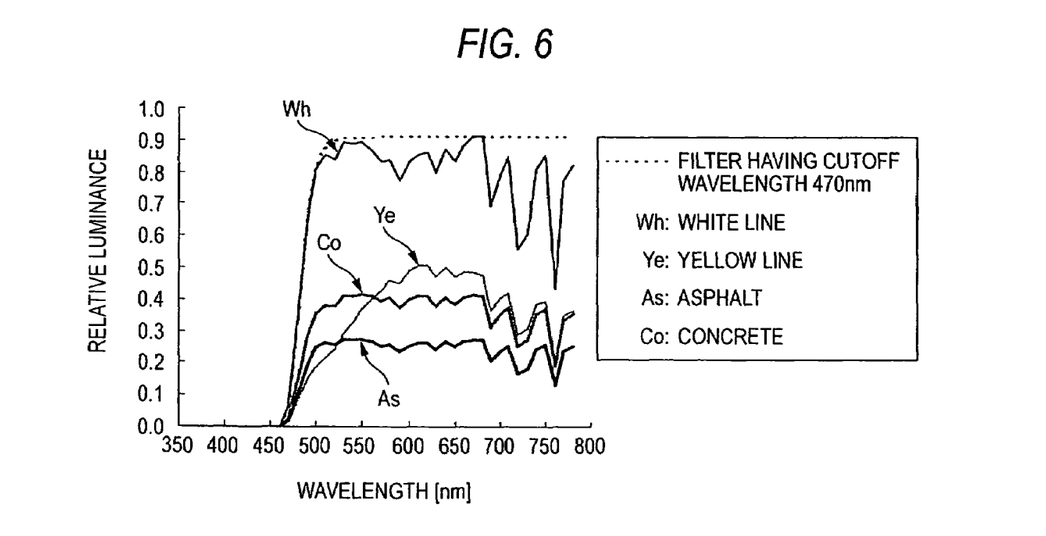
FIG. 6 is a graph showing spectral characteristics of road surfaces and lane boundary lines in the case where an optical filter that transmits a component whose wavelength is longer than or equal to 470 nm is used according to a fourth embodiment of the invention.

FIG. 6 shows spectral characteristics of a white line Wh, a yellow line Ye, an asphalt road As, and a concrete road Co in the case where the cutoff wavelength is set at 470 nm. It is seen that the integral values of the spectral characteristics of the yellow line Ye and the concrete road Co are the same.

Even if the cutoff wavelength is longer than or equal to 470 nm, a desired luminance difference cannot be attained in a wavelength range where the spectral characteristics of the yellow line Ye and the concrete road Co are approximately the same. This is a wavelength range that is longer than 740 nm. Therefore, it can be said that the upper limit of the cutoff wavelength is 740 nm. That is, Inequalities (1) can be satisfied by using an optical filter whose cutoff wavelength is in the range of 470 nm to 740 nm.

The above limit cutoff wavelengths vary depending on the spectral characteristics Ye(λ) of yellow lines and the spectral characteristic of Co(λ) of concrete roads varies from one country to another. It goes without saying that the limit cutoff wavelengths for an object and a background need to be determined according to Inequalities (1) or Equation (3).

The same advantages as of the first embodiment can be obtained by selecting an optical filter in the above-described manner, that is, in such a range that the feature of an imaging object is not impaired.

Embodiment 5

In the above embodiments, no particular measures are taken in the infrared range. Since the lens 1 of the camera is usually designed so as to minimize aberrations in the visible range, a focusing error may occur in the infrared range. Further, the spectral sensitivity characteristic of the image pickup device 3 covers the infrared range. These are factors that lower the sharpness of a resulting image. In the nighttime, in particular, a very blurred image is obtained because various light sources emit light that includes an infrared component.

The use of an infrared cutting filter is effective in solving this kind of problem. However, it is important that the infrared cutting filter be selected so as not to influence the feature of an imaging object that is enhanced by using the optical filter 2, that is, the effective spectral characteristic of yellow lines in the wavelength range of 550 nm to 650 nm.

Figure 7:
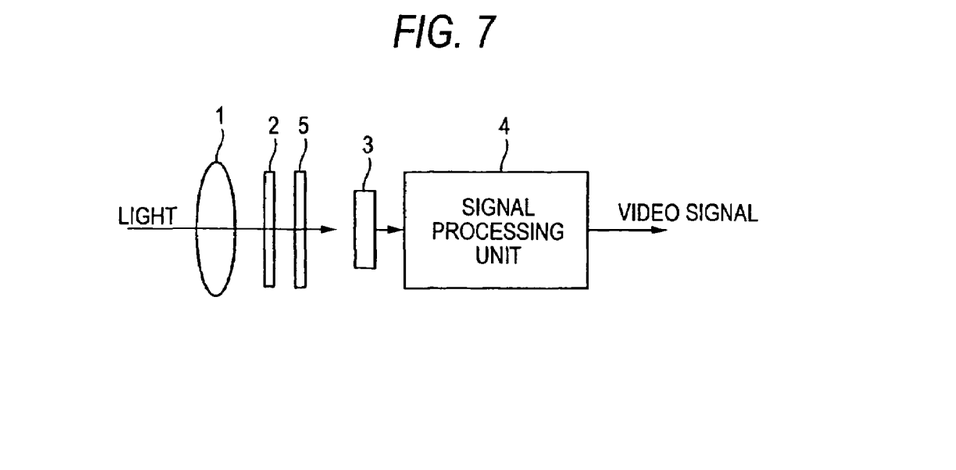
FIG. 7 schematically shows the configuration of a vehicular camera according to a fifth embodiment of the invention.

FIG. 7 schematically shows the configuration of an important part of a vehicular camera according to a fifth embodiment of the invention. In FIG. 7, reference numeral 5 denotes an infrared cutting filter. Although the infrared cutting filter 5 is disposed between the optical filter 2 and the image pickup device 3, no particular limitations are imposed on the location of the infrared cutting filter 5. The other part of the configuration is the same as shown in FIG. 1 and hence will not be described. Components in FIG. 7 having the same or corresponding components in FIG. 1 are given the same reference numerals as the latter.

Figure 8:
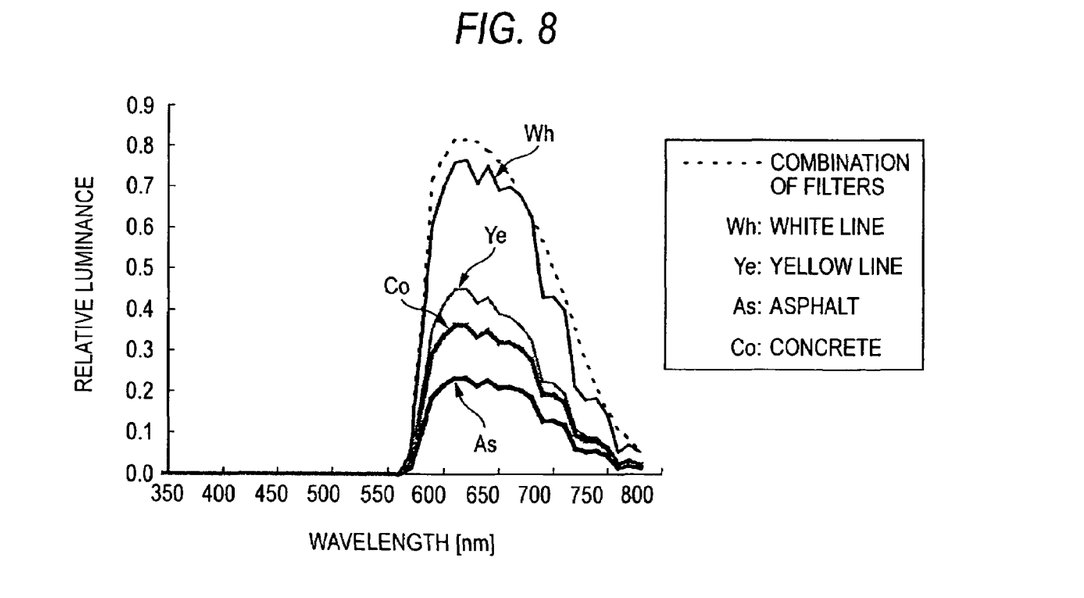
FIG. 8 is a graph showing spectral characteristics of road surfaces and lane boundary lines in the case where an optical filter that transmits a component whose wavelength is longer than or equal to 580 nm and an infrared cutting filter are used according to a fifth embodiment of the invention.

FIG. 8 shows spectral characteristics of a white line Wh, a yellow line Ye, an asphalt road As, and a concrete road Co in the case where the infrared cutting filter 5 and the optical filter 2 having a cutoff wavelength 580 nm are used. It is seen that infrared components are cut and that Inequalities (1) are satisfied because the luminance losses in the effective wavelength range of the yellow line Ye (550 nm to 650 nm) are small.

The simultaneous use of the infrared cutting filter 5 and the optical filter 2 provides the same advantages as of the first to fourth embodiments without being influenced by a problematic infrared component.

Embodiment 6

In the fifth embodiment, a ghost image necessarily occurs due to inner surface reflection because of use of two filters, that is, the optical filter 2 and the infrared cutting filter 5.

In view of the above, in a sixth embodiment, a single-plate optical filter is used that is formed so as to have both of the characteristics of the optical filter 2 and the infrared cutting filter 5 of the fifth embodiment (an optical filter that transmits a component in an arbitrary wavelength range can be formed relatively easily).

Figure 9:
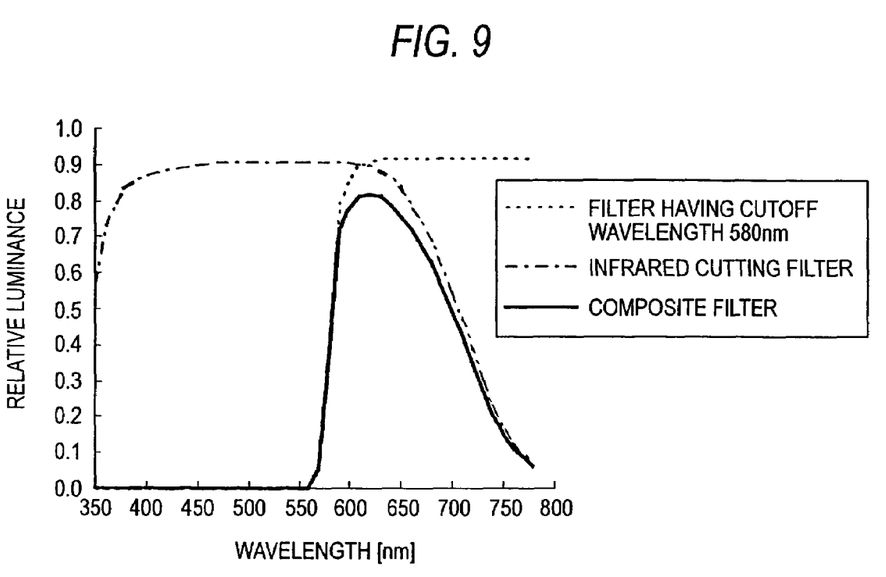
FIG. 9 is a graph showing a spectral transmittance characteristic of a single-plate filter according to a sixth embodiment of the invention.

FIG. 9 shows a characteristic of this filter. Naturally, using this filter solely provides the same spectral characteristic as shown in FIG. 8.

The use of the optical filter having the spectral characteristic of FIG. 9 can provides the same advantages as of the fifth embodiment though the vehicular camera uses the single-plate filter, that is, has the simplest configuration of FIG. 1. Where a plurality of filters are laid one on another, such a problems as a ghost or a flare occurs due to inner surface reflection. The configuration of this embodiment not only can solve this problem but also is advantageous in cost.

According to the invention, attention is paid to features of spectral characteristics of a plurality of imaging objects and an optical filter is selected so as to produce a difference between light quantities, on the surface of the image pickup device, of each of the imaging objects and a background, the difference being effective for image processing. Therefore, the invention can provide a vehicular camera capable of facilitating image processing and producing a clear image even with an object of detection that is low in contrast or is much influenced by an disturbance.

Further, the invention can provide a vehicular camera capable of preventing a ghost image due to inner surface reflection by using a single-plate optical filter formed by integrating an optical filter having a prescribed spectral transmittance characteristic and an infrared cutting filter.

The invention can be applied to a vehicular camera that is mounted on a vehicle and serves for recognition of white lines on the road on which the vehicle is running, detection of obstacles, and other purposes.

What is claimed is:

1. A vehicular camera for detecting desired imaging objects by shooting surroundings of a vehicle, comprising:
   a lens for forming an image of light coming from the outside on an image pickup device;
   the image pickup device for performing photoelectric conversion on the image formed thereon;
   an image processing unit for producing a video signal by processing a signal produced by the image pickup device; and
   an optical filter for causing a difference between luminance of each of n kinds of objects to be detected and luminance of a background, the optical filter having a spectral transmittance characteristic F(λ) that satisfies $$\int F_1(\lambda)F(\lambda)d\lambda > \int F_m(\lambda)F(\lambda)d\lambda$$

$$\int F_2(\lambda)F(\lambda)d\lambda > \int F_m(\lambda)F(\lambda)d\lambda$$

$$\int F_n(\lambda)F(\lambda)d\lambda > \int F_m(\lambda)F(\lambda)d\lambda$$

where $\lambda$ is wavelength of light, $F_1(\lambda)$, $F_2(\lambda)$, ..., $F_n(\lambda)$ are spectral characteristics of the n kinds of objects to be detected, respectively, and $F_m(\lambda)$ is a spectral characteristic of a background.

2. The vehicular camera according to claim 1, wherein the spectral transmittance characteristic $F(\lambda)$ of the optical filter is such as to allow transmission of a component whose wavelength is longer than or equal to a prescribed cutoff wavelength.

3. The vehicular camera according to claim 1, wherein the spectral transmittance characteristic $F(\lambda)$ of the optical filter is such as to allow transmission of a component whose wavelength is shorter than or equal to a prescribed cutoff wavelength.

4. The vehicular camera according to claim 1, wherein the spectral transmittance characteristic $F(\lambda)$ of the optical filter is such as to allow transmission only a component in a wavelength range of a particular color.

5. The vehicular camera according to claim 1, wherein the spectral transmittance characteristic $F(\lambda)$ of the optical filter is such as to interrupt only a component in a wavelength range of a particular color.

6. The vehicular camera according to claim 1, further comprising an infrared cutting filter that is used in combination with the optical filter.

7. The vehicular camera according to claim 6, wherein the optical filter and the infrared cutting filter are provided in the form of a single-plate filter.

8. The vehicular camera according to claim 2, wherein the n kinds of objects to be detected include white and yellow lane boundary lines on a road and the background is an asphalt or concrete road surface, and the cutoff wavelength of the spectral transmittance characteristic $F(\lambda)$ of the optical filter is 580 nm.

9. The vehicular camera according to claim 8, further comprising an infrared cutting filter that is used in combination with the optical filter.

10. The vehicular camera according to claim 9, wherein the optical filter and the infrared cutting filter are provided in the form of a single-plate filter.

11. The vehicular camera according to claim 3, wherein the n kinds of objects to be detected include white and blue lane boundary lines on a road and the background is an asphalt or concrete road surface, and the cutoff wavelength of the spectral transmittance characteristic $F(\lambda)$ of the optical filter is 600 nm.

12. The vehicular camera according to claim 1, wherein the n kinds of objects to be detected include white and yellow boundary lines on a road and the background is an asphalt or concrete road surface, and the spectral transmittance characteristic $F(\lambda)$ of the optical filter is such as to allow transmission of a component whose wavelength $\lambda$ satisfies $$470 \text{ nm} \leq \lambda \leq 740 \text{ nm}.$$

13. The vehicular camera according to claim 12, further comprising an infrared cutting filter that is used in combination with the optical filter.

14. The vehicular camera according to claim 13, wherein the optical filter and the infrared cutting filter are provided in the form of a single-plate filter.

* * * * *